United States Patent [19]

Huss

[11] E Re. 30,328

[45] Reissued Jul. 8, 1980

[54] APPARATUS FOR DEVELOPING A TRAVELLING PHOTOGRAPHIC EMULSION CARRIER

[76] Inventor: Heinrich Huss, Liebigstr. 1, 6051 Weiskirchen, Fed. Rep. of Germany

[21] Appl. No.: 933,781

[22] Filed: Aug. 14, 1978

Related U.S. Patent Documents

Reissue of:

[64] Patent No.: 4,034,389
Issued: Jul. 5, 1977
Appl. No.: 615,794
Filed: Sep. 22, 1975

[30] Foreign Application Priority Data

Sep. 24, 1974 [DE] Fed. Rep. of Germany ..... 2445503

[51] Int. Cl.[2] ..... G03D 3/08

[52] U.S. Cl. ..... 354/322; 354/316; 354/320; 134/64 P; 134/122 P

[58] Field of Search ..... 134/64 P, 64 R, 122 P, 134/122 R; 354/316, 319, 320, 321, 322, 325, 317, 318, 331; 15/100

[56] References Cited

U.S. PATENT DOCUMENTS

| | | | |
|---|---|---|---|
| 525,849 | 9/1894 | Mackusick | 354/321 |
| 1,102,737 | 7/1914 | Greene | 134/122 R |
| 1,761,304 | 6/1930 | Langsner | 134/122 P |
| 1,787,824 | 1/1931 | Jones | 352/37 |
| 1,846,570 | 2/1932 | Rochestie et al. | 134/122 R |
| 1,847,833 | 3/1932 | Horst | 354/319 |
| 1,861,607 | 6/1932 | Murck | 134/64 R |
| 1,987,062 | 1/1935 | Hickman | 118/230 |
| 2,102,843 | 12/1937 | Gwynne | 354/320 |
| 2,224,947 | 12/1940 | Blaney | 339/63 M |
| 2,263,380 | 11/1941 | Coleman | 134/122 R |
| 2,724,254 | 11/1955 | Zanger | 354/322 |
| 3,366,025 | 1/1968 | Layne | 354/322 |
| 3,418,913 | 12/1968 | Snarr | 354/325 |
| 3,598,037 | 8/1971 | Houston | 354/319 |
| 3,690,758 | 9/1972 | Knechtel et al. | 354/320 |
| 3,702,581 | 11/1972 | Speakman | 430/403 |
| 3,710,703 | 1/1973 | Bruno et al. | 354/321 |
| 3,779,206 | 12/1973 | Sato et al. | 118/63 |
| 3,922,701 | 11/1975 | Geyken et al. | 354/299 |

*Primary Examiner*—L. T. Hix
*Assistant Examiner*—Alan Mathews
*Attorney, Agent, or Firm*—Ralph R. Roberts

[57] ABSTRACT

The apparatus has at least two containers for baths of treating liquid. Each container accommodates a plurality of guide rollers which guide the carrier in a loop-shaped path through the container, the path having a bight [,] and a deflecting roller which deflects the carrier in the bight. All of the rollers are at least partly immersed in the respective bath. A receptacle is provided for accommodating a body of fresh rinsing water, and a carrier transfer roller is at least partly immersed in the body of water in the receptacle and engages and transfers the carrier from one to the other of the containers.

14 Claims, 8 Drawing Figures

APPARATUS FOR DEVELOPING A TRAVELLING PHOTOGRAPHIC EMULSION CARRIER

Matter enclosed in heavy brackets [ ] appears in the original patent but forms no part of this reissue specification; matter printed in italics indicates the additions made by reissue.

BACKGROUND OF THE INVENTION

*Field of the Invention*

The present invention relates to an apparatus for developing a travelling photographic emulsion carrier[,] of the strip-shaped or sheet-shaped type.

It is already known in the art to provide an apparatus of this general type having a plurality of containers each accommodating a bath of a different treating liquid, for example, a developer bath, a fixing bath and a washing or rinsing bath. The emulsion carrier is sequentially moved through the respective baths[,] travelling from one container to the next in a substantially undulate path.

This type of [prior-art] *prior art* apparatus has certain disadvantages[,] resulting inter alia from the fact that the substances of some of the baths are [agressive] *aggressive* with respect to the work pieces which they contact. Furthermore, there is the danger that any one bath may become contaminated with [quantities] *liquids* of the baths from the preceding container which adhere to the emulsion carrier and are, therefore, imported into the bath of the suceeding container. Also, the moist photographic emulsion layers are highly susceptible to mechanical damage and the emulsion carrier itself is hygroscopic, a characteristic which tends to cause an expansion of the emulsion carrier in lengthwise direction as the carrier is being transported through the apparatus.

There is nothing in the prior art to provide satisfactory solutions to these problems. Such attempts as have been made to overcome the difficulties have had to be made at the expense of ease of operation and maintenance of the apparatus so that by providing partial solutions to one set of problems an entire new set of difficulties was created. Moreover, it was heretofore found to be impossible to prevent mechanical damage to the emulsion carrier due to rubbing of the emulsion carrier against the guide baffles employed in the [prior-art] *prior art* apparatus and no solution has been found to prevent the undesired transfer of liquid from one bath into the liquid of a different [secreting] *succeeding* bath.

Another problem which exists, but has not even been considered in the prior art, is the fact that guide rollers guiding the emulsion carrier for the respective [bath] *baths* tend to have a film of the bath liquid dry on their circumferential surfaces, i.e., on those portions of the circumferential surfaces which are located in the atmosphere and not immersed in the bath liquid[,] if the rollers stand still for a period of time, for example, during machine down-time.

SUMMARY OF THE INVENTION

Accordingly, it is a general object of this invention to overcome the aforementioned disadvantages.

More particularly, it is an object of the invention to provide an improved apparatus of the type in question which is not possessed of those disadvantages.

Another object of the invention is to provide [such] an improved apparatus in which the photographic emulsion carrier is treated much more carefully than before and not subjected to mechanical damage.

Another object of the invention is to provide [such] an apparatus which is so constructed that it can be maintained and repaired [in] *by* various simple [manner,] *means* and in particular can be kept clean without any difficulties.

An additional object of the invention is to provide [such] an apparatus in which the contamination of a succeeding bath with liquid from a preceding bath is avoided.

To be able to meet these requirements it is important that throughout its entire travel through the apparatus the emulsion carrier must come in contact only with such surfaces or surface portions which are either immersed in or at least wetted by a liquid, and wherein changes in the direction of travel of the emulsion carrier are accomplished by deflecting the latter over bending radii which are as large as possible and/or by accomplishing or aiding such changes in the direction of travel by means of directed fluid streams.

Based upon these understandings, and in keeping with the above objects, one feature of the invention resides in an apparatus for developing a travelling photographic emulsion carrier[,] which comprises at least two containers for baths of treating liquid[,] and emulsion carrier guide means in the respective containers. Each such guide means comprises a plurality of guide rollers for guiding a carrier in a loop-shaped bath having a bight[,] and a deflecting roller for deflecting the carrier in the bight, all of the rollers being at least partially immersed in the respective bath. A receptacle is provided for accommodating a body of fresh water, and carrier transfer roller means is at least partly immersed in the body of water and operative for engaging and transferring the carrier from one to the other of the containers.

This construction assures that the moist emulsion carrier, which is highly susceptible to mechanical damage, will always be guided only by and between moist surfaces. Furthermore, the carrier transfer roller means is constantly being washed as it rotates in the body of water and thus forms a barrier against the transportation of liquid from a preceding bath into the bath of a succeeding container. Moreover, if for any reason the carrier transfer roller means must stand still and a portion of its surface is exposed to the atmosphere, the fact that the transfer roller means is constantly being cleaned by rotating in or through the body of water[,] assures that no deposits of treating bath liquid can form on the transfer roller means which present cleaning difficulties, as is well known from the prior art.

The change in the direction of movement of the emulsion carrier, i.e. in the region of the bight of the loop-shaped path in which the emulsion carrier travels, is facilitated and the possibility of mechanical damage to the emulsion carrier is reduced[,] if according to a further concept of the invention the apparatus includes, laterally of the deflecting roller, a pressure chamber out of which a fluid under pressure flows against the exterior side of the emulsion carrier[, i.e. the]. *The* side of the emulsion carrier which faces away from the deflecting roller[, was deflecting] *deflects* the emulsion carrier against and into contact with the circumferential surface of the deflecting roller. It is advantageous if the pressure chamber extends over the entire length of the respective container[, i.e. the]. *The* dimension of the container in the axial direction of the deflecting roller[, and] is extended [in] *to* form [of] a guide baffle which is concentric with the deflecting roller [and]. *This baffle* forms [with the same] a channel through which the emulsion carrier and the pressure fluid issuing from the pressure chamber will travel. This eliminates the type of guide baffles required in the prior art, and the need for the additional deflecting rollers that are also required in the prior art[, thereby also overcoming the]. *The* difficulties [resulting] in the prior art *resulting* from different circumferential speeds of varying deflecting [roller] *rollers are also overcome.* Thus, the apparatus according to the present invention is simpler in construction than those of the prior art and treats the emulsion carrier much more gently—in the sense of mechanical stress—than the [prior-art] *prior art* apparatus.

The deflection of the emulsion carrier by directing a flow of pressure fluid out of the pressure chamber against it can be combined, in a particularly simple manner, with a circulation of the respective bath[,] if a circulating pump is used whose suction side communicates with the bath and whose pressure side communicates with the pressure chamber. The circulated bath liquid then flows out of the pressure chamber—which preferably is located adjacent the bottom wall of the respective container and has the form of a tube extending over the entire width of the container and formed with outlet nozzles—and flows around the circumference of the guide rollers and the deflecting roller over the entire axial length thereof, thus assuring a uniform treatment of the emulsion carrier as the liquid flows upwardly in the container to the level at which the suction side of the pump communicates with the [latter] *emulsion carrier.*

A further way of eliminating the possibility of mechanical damage to the emulsion carrier is to avoid the provision of fixed guide baffles or guide surfaces in conjunction with the carrier transfer roller of the apparatus. According to the present invention, this is achieved by associating with the carrier transfer roller or rollers either a deformable counter roller which is in loose engagement with thw deflecting roller or two counter rollers which are located at opposite lateral sides of the axis of rotation of the transfer roller[,] *and* extending parallel thereto and loosely engaging the transfer roller. A further possibility is to provide an endless belt or band which is [trained] *directed* about two reversing rollers and which has one run, for example the lower run, in loose contact with the periphery of the transfer roller. In [any of these] *the shown* embodiments, the counter rollers or the band gently squeeze from the emulsion carrier any liquid that adheres to it from the preceding bath [and, as they themselves come in contact with the periphery of the transfer roller (after]. *After* the carrier has passed beyond the [latter) which] *counter roller the band comes into contact with the periphery of the transfer roller, and this transfer roller* is constantly being washed by immersion in the body of water[, any]. *Any* bath liquid adhering to the counter rollers or the band is washed off by such contact.

According to a particularly advantageous embodiment of the invention, rinsing water [can also be] *is* supplied from above to the counter roller or to the endless band. If there are two [of the] counter rollers present at opposite sides of the axis of rotation of the transfer roller[, then] a [rinsing] tube may be arranged above them which discharges rinsing water into the space between the counter rollers. If an endless band is utilized, [then] a hollow rinsing roller may be located above the upper run of the band[, contacting] *and contacts* this run in such a manner as to depress it downwardly slightly in a trough-shaped configuration[, the]. *The* interior of the rinsing roller[—]-which [of course] is [perforate—being] *perforated is* supplied with water [from a source]. In either case, the water [thus] supplied serves the desired cleaning purpose and runs off at the opposite axial ends of the transfer roller into the receptacle accommodating the body of water[, and from there]. *The water* is removed *from the receptacle* in the usual manner, for example, by means of an overflow.

The novel features which are considered as characteristic [for] *of* the invention are set forth in particular in the appended claims. The invention itself, however, both as to its construction and its method of operation, together with additional objects and advantages thereof will be best understood from the following description of specific embodiments when read in connection with the accompanying drawings.

DESCRIPTION OF THE PREFERRED EMBODIMENTS

Figure 1:
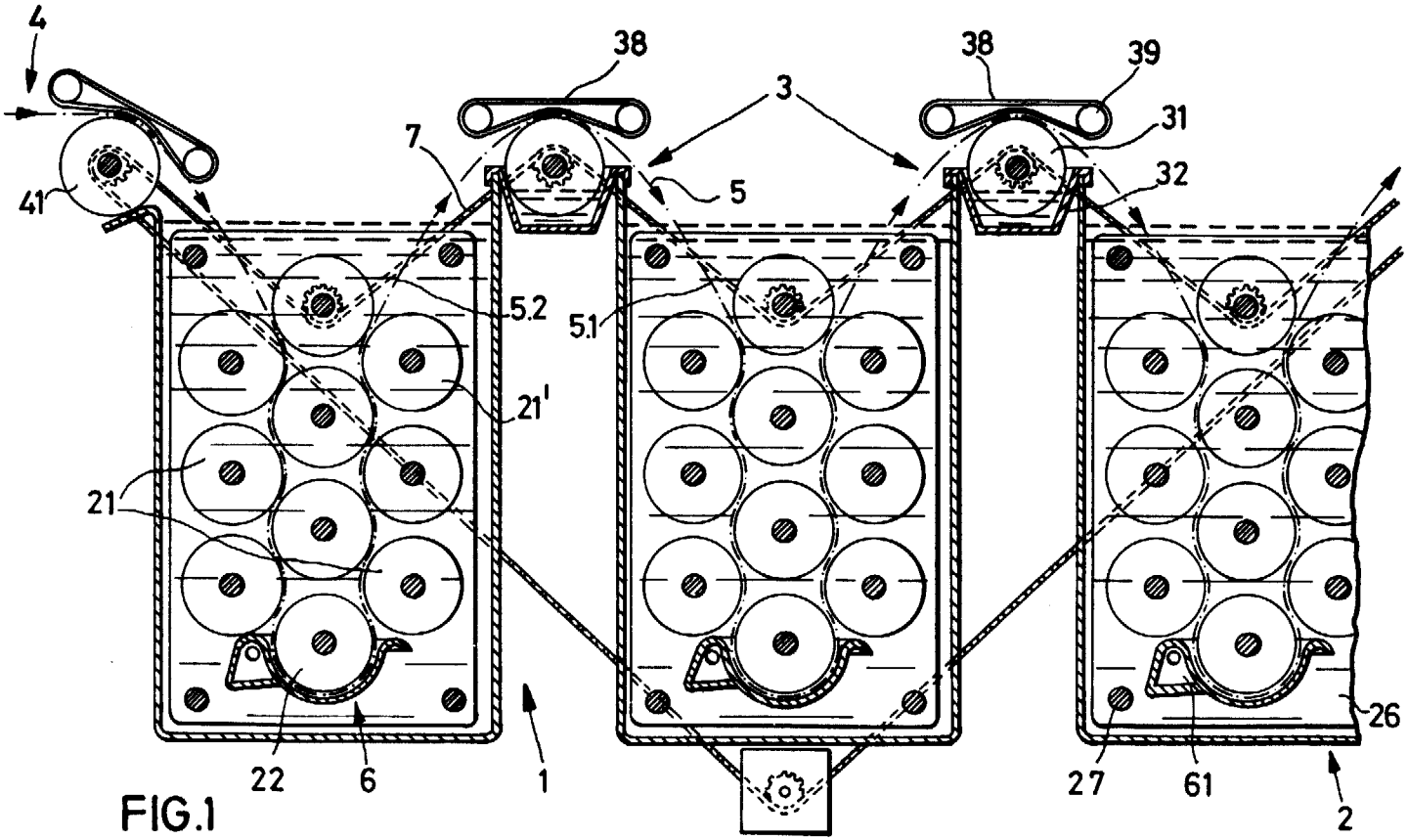
FIG. 1 [is] *represents* a diagrammatic, fragmentary vertical section [through an] *showing the* apparatus of the present invention.
Figure 3:
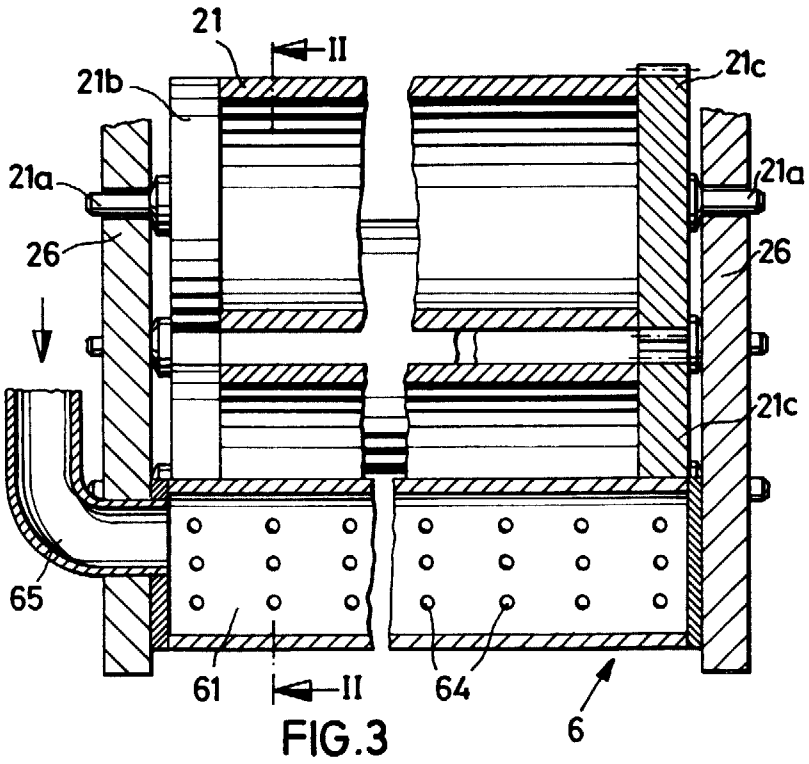
FIG. 3 [is] *represents* a section taken on *the* line III—III of FIG. 2.
Figure 2:
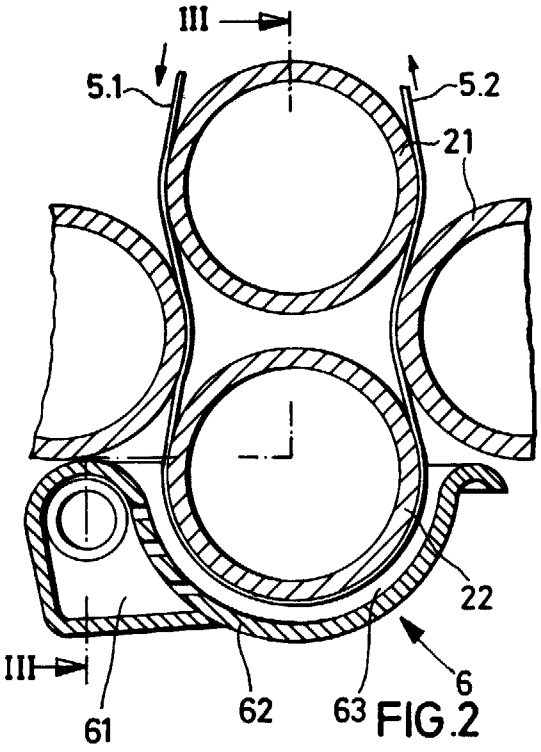
FIG. 2 [is] *represents* an enlarged section taken on the line II—II of FIG. 3.

A first embodiment of the invention is illustrated in FIGS. 1–3 of the [drawing] *drawings.* FIG. 1 shows an apparatus which is generally designated with reference numeral 1 and which has a plurality of containers 2 for baths of various liquid media. Three of these containers 2 are illustrated. Between any two adjacent [ones of the] containers 2 there are arranged transfer devices 3[, and ahead]. *Ahead* of the first of the containers 2, which *containers* are arranged in sequence, there is provided a feeding or supplying device 4 which admits into the apparatus a photographic emulsion carrier 5 that [is to travel] *travels* in a looped path through the several containers 2 in succession.

Each of the containers 2 accommodates emulsion carrier guide means guiding the emulsion carrier 5 in a bath that is loop-shaped and has a downward path portion 5.1, an upward path portion 5.2 and a bight connecting the path portions 5.1 and 5.2 at their lower ends. The emulsion carrier guide means [comprises] *includes* guide rollers 21 which are arranged in [form of] three upright rows, a center row and two outer rows at opposite sides of the center row[, and a]. *A* deflecting roller 22 *is* located in the bight of the bath and [serving] *serves* to deflect the travelling emulsion carrier 5 from the downwardly extending path portion 5.1 into the upwardly extending path portion 5.2.

The rollers 21 and 22 rotate about parallel axes which, *as shown* in FIG. 1, extend normal to the plane of the drawing. The manner in which the axes of the rollers are mounted for rotation and the manner in which they are driven in rotation[,] are known from the art and need not be described in detail herein[, especially] as these aspects do not form a part of the novel subject matter. For *the* purposes of better understanding, it is [merely] pointed out that the supply roller 41 of the device 4, the carrier transfer rollers 31 of the devices 3 and the uppermost guide rollers 21 of one of the rows of rollers 21 in each container 2 are all driven in synchronism[, for]. *For* example, by means of a chain drive 7 which is shown in phantom lines in FIG. 1. The rollers 21, 22 and 31 are all of identical diameter[; the]. *The* diameter of the roller 41 is smaller than that of the rollers 21, 22 and 31 by about 1-2%. All of the rollers[, having] *of* identical diameter, therefore, also rotate at identical peripheral speed and if they are of identical length and their mounting journals and shafts are identical, [as they advantageously will be,] any one roller can be replaced with any other roller of the ones [designated] *designed* with reference numerals 21, 22 and 31.

All of the rollers accommodated within the respective containers 2 are fully immersed below the level of the bath in the respective container. Their mounting shafts are journalled in support plates 26, as shown in FIG. 3 [which], *and they* are connected in pairs by spacing bolts 27. Thus, the plates 26 and the rollers 21 and 22, in the respective container, form a unit which can be withdrawn upwardly out of the container in toto, thus greatly facilitating the inspection and/or repair of the various components[,] and also any cleaning that may be necessary. The successive containers 2 are spaced from one another far enough so that the receptacles 32 of the devices 3 can be suspended from upwardly extending portions of the container sidewalls, as shown in FIG. 1, and are thus out of the way of the emulsion carrier guide means as it is withdrawn from or inserted into the respective container 2. The devices 3 have associated with them respective counter rollers or counter-pressure devices that serve to slightly squeeze the emulsion carrier 5 between themselves and the transfer rollers 31 of the devices 3. These counter rollers or analogous devices, for example 38 *as seen* in FIG. 1, can be moved laterally out of the way[, for example] by pivoting, as is also the case with the device 4.

FIGS. 2 and 3 show the lower portions of an emulsion carrier guide means of the respective container 2, the illustration being approximately to scale.

FIG. 3 shows the journalling of one of the guide rollers 21 with its journalling pins or shafts 21a which are journalled in the end plates or mounting plates 26. The rollers 21 and 22—just as the rollers 31 and 41—are advantageously made of tubes of synthetic plastic material that is immune to attack by the bath liquids of the respective containers 2[, advantageously]. *Advantageously,* acrylic material having a smooth polished surface[, and the tube has] *may be used. These tubes have* a diameter of between 40 and 80 millimeters, depending upon the choice of the designer [and is]. *These tubes are* closed at [its] *their* opposite axial ends[, at]. *These tubes are closed at* one end by means of an end plate 21b which carries one of the pins 21a and at the other end by means of an end plate 21c which carries [the other] *a* pin 21a [and is]. *These tubes are* provided with an annulus of circumferentially extending gear teeth. The rollers 21 and 22 are coupled in motion-transmitting relationship via the gear teeth of the end plates 21c.

Only the uppermost guide rollers 21' of [one] *the* outer row of rollers 21 in the respective container 2, namely that row of rollers 21 which together with the center row guides the emulsion carrier 5 in the upward path portion 5.2, is not driven by gear teeth as are the others. Instead, it is journalled in the plates 26 in such a manner that due to its buoyancy it can float slightly upwardly in the bath liquid and can engage, under the influence of its [buoyancy] *buoyance,* the outer circumference of the uppermost guide roller 21 of the center row. Thus, the roller 21' exerts a slight bending moment upon the emulsion carrier 5 travelling in the path portion 5.2 so that the emulsion carrier 5 flexes slightly—while still within the bath liquid—in the direction towards the transfer roller 31 of the device 3 [which]. *This device 3* is located between the container 2 from which the emulsion carrier 5 is about to emerge and the next successive container 2. This eliminates any necessity for separate deflecting devices as is required in the prior art to achieve the same purpose.

FIGS. 2 and 3 also show the construction of the deflecting arrangement 6 that is present in each of the containers 2. Laterally of the deflecting roller 22 there is provided wall means forming a pressure chamber 61 [which is extended wall means forming a pressure chamber 61] which is extended in form of a guide baffle 62 that is concentric to the roller 22 and forms with a portion of the periphery thereof a guide channel 63 through which the emulsion carrier 5 travels. Liquid is admitted under pressure into the chamber 61 and issues from the same through nozzle-shaped openings 64 (compare FIG. 3) into the channel 63[,] to travel with the emulsion carrier 5 therein. Advantageously, this liquid is the liquid of the bath itself[,] being withdrawn at a location below the upper level of the bath from the respective container 2 by means of a suction conduit (not shown) [communicating via]. *This liquid communicates by* a filter with a circulating pump (neither of these is shown) and [which] *this fluid* is pumped under pressure [via] *by* a pressure conduit 65 into the chamber 61. Due to the flow of this pressure liquid in the channel 63 in the same direction as the advancement of the emulsion carrier 5, the leading edge of an emulsion carrier 5 travelling downwardly in the path portion 5.1 is so engaged and deflected by the pressure liquid entering from the chamber 61 through the openings 64 that the emulsion carrier 5 may perhaps become deflected into contact with the outer circumference of the deflecting roller 22 but cannot engage and scrape along the guide baffle 62 to become damaged thereby.

When the containers 2 are emptied from time to time[,] for cleaning purposes and to replace spent bath liquid with fresh bath liquid, the containers and the entire arrangement can be readily cleaned by admitting fresh water into the containers 2 and circulating this fresh water [via] *by* the aforementioned pump, thus eliminating even small residual quantities of bath liquid that might otherwise remain. The aforementioned filter, incidentally, could also be arranged in the pressure conduit 65, if desired.

Further embodiments of the invention are shown fragmentarily and on the same scale as in FIGS. 2, [and] 3, [in the FIGS.] 4, 5, 6, [and 7-8] *7 and 8.*

Figure 4:
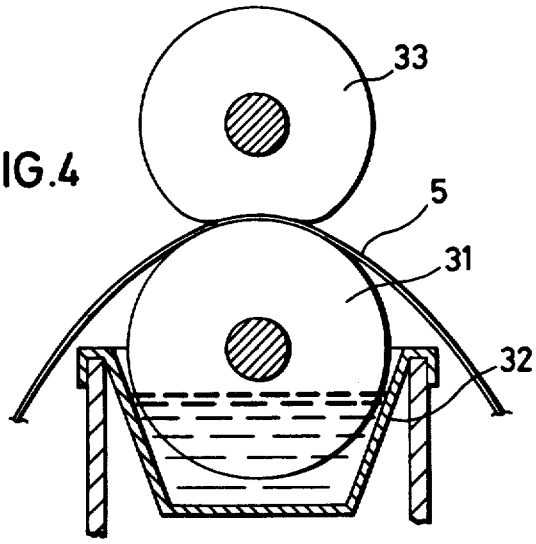
FIG. 4 [is] *represents* a fragmentary vertical section showing details of a further embodiment of the invention.

FIG. 4 shows an embodiment which [in all respects] corresponds to that of FIGS. 1-3[, i.e. in all respects which have not been illustrated,] except that the carrier transfer roller 31 of each device 3 cooperates with a counter roller 33 which is mounted above it for rotation and which is [of such] a material[, for example particularly] *such as* soft rubber or rubber-like material, particularly synthetic plastic foam material[,] *so* that it can be readily deformed under the influence of its own weight as it rests upon the periphery of the roller 31, as illustrated. For this purpose the roller 33 can have a central shaft[,] or [else] shaft end portions at its opposite axial ends which are journalled in vertical guide slots of suitable upright supports or the like which may be mounted on the receptacle 32 [and are not shown]. The roller 31 is mounted for rotation, for example, in the same supports[,] in such a manner that its periphery constantly dips into and emerges from a body of rinsing water [is] constantly being renewed by admitting fresh water (not shown) and removing it by way of an overflow or the like (also not shown). By providing an overfow the water level can always remain constant. The roller 31 is driven in synchronism with the rollers 21 and 22, whereas the roller 33 is driven only by frictional engagement with the roller 31, or rather with the emulsion carrier 5 that travels between them and from which the rollers 31 and 33 squeeze any residual quantities of bath liquid from the preceding container 2. The roller 31 is constantly being cleaned as it travels through the body of water in the receptacle 32, and once the trailing end of an emulsion carrier 5 has passed between the rollers 31 and 33, the latter engages the circumference of the roller 31 and is thus also cleaned by the fresh water which adheres to this circumference.

Figure 5:
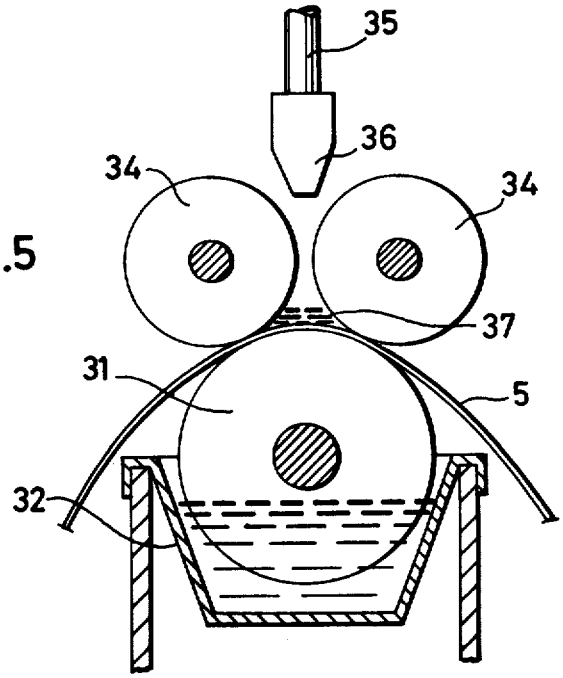
FIG. 5 [is] *represents* a view similar to FIG. 4, but showing a third embodiment of the invention.

A somewhat different embodiment serving the same purpose is illustrated in FIG. 5. In this Figure like reference numerals identify like elements as before. Instead of a single counter roller 33, however, the embodiment of FIG. 5 provides two counter rollers 34 which are also located above the roller 31 but at opposite sides of the longitudinal axis of rotation [of the same, having their]. *Each roller has its* own axis of rotation which [extend] *extends* in parallelism with the axis of rotation of the roller 31. The rollers 34 define between themselves a gap and a nozzle 36 which receives fresh water from a supply conduit 35 [and on which it is mounted,]. *This conduit* discharges the fresh water into this gap so that not only the periphery of the rotating rollers 34 are constantly being cleaned by the fresh water, but the fresh water also constantly flushes the upwardly directed surface of the emulsion carrier 5 travelling between the rollers 34 and the roller 31. The nozzle 36 is elongated in the direction of the receptacle 32, i.e. in the direction normal to the plane of the drawing. The gap defined between the rollers 34 and the emulsion carrier 5 is identified with reference numeral 37. It is open at its opposite axial ends so that the water can run over the end faces of the [rofller] *roller* 31 into the receptacle 32 whose liquid level is maintained constant in the same manner as described before with reference to FIG. 4.

Figure 6:
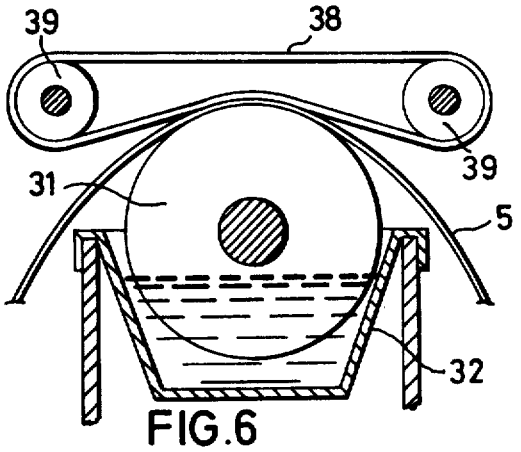
FIG. 6 [is] *represents* a view analogous to FIG. 5, showing a fourth embodiment of the invention.

FIG. 6 shows a further embodiment of the invention where again like reference numerals identify like components. In FIG. 6 the counter roller or rollers of FIGS. 4 and 5 are replaced with an endless band 38 which is [trained] *carried* about two reversing rollers 39 extending parallel to the axis of rotation of the roller 31. The lower run of the endless band 38 engages the circumference of the roller 31 under slight pressure and the emulsion carrier 5 passes between this circumference and the lower run of the endless band 38[,] so that bath liquid from the bath of the preceding container 2 is squeezed in this manner from the emulsion carrier 5. The cleaning of the roller 31 and of the band 38 is the result of the constant dipping of the roller 31 into the clean water in the receptacle 32.

Figure 7:
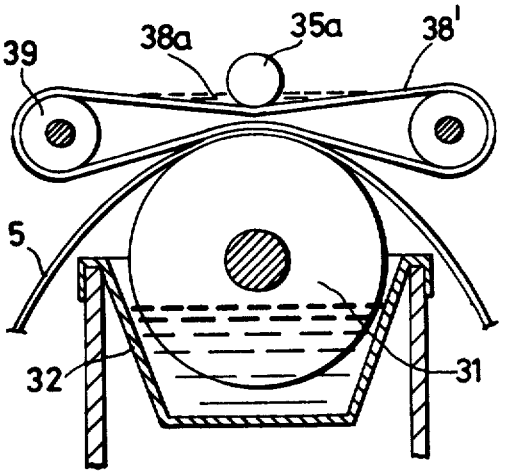
FIG. 7 [is] *represents* a view similar to FIG. 6, but illustrating a first embodiment of the invention[;], and FIG. 8 [is] *represents* a top perspective of FIG. 7.
Figure 8:
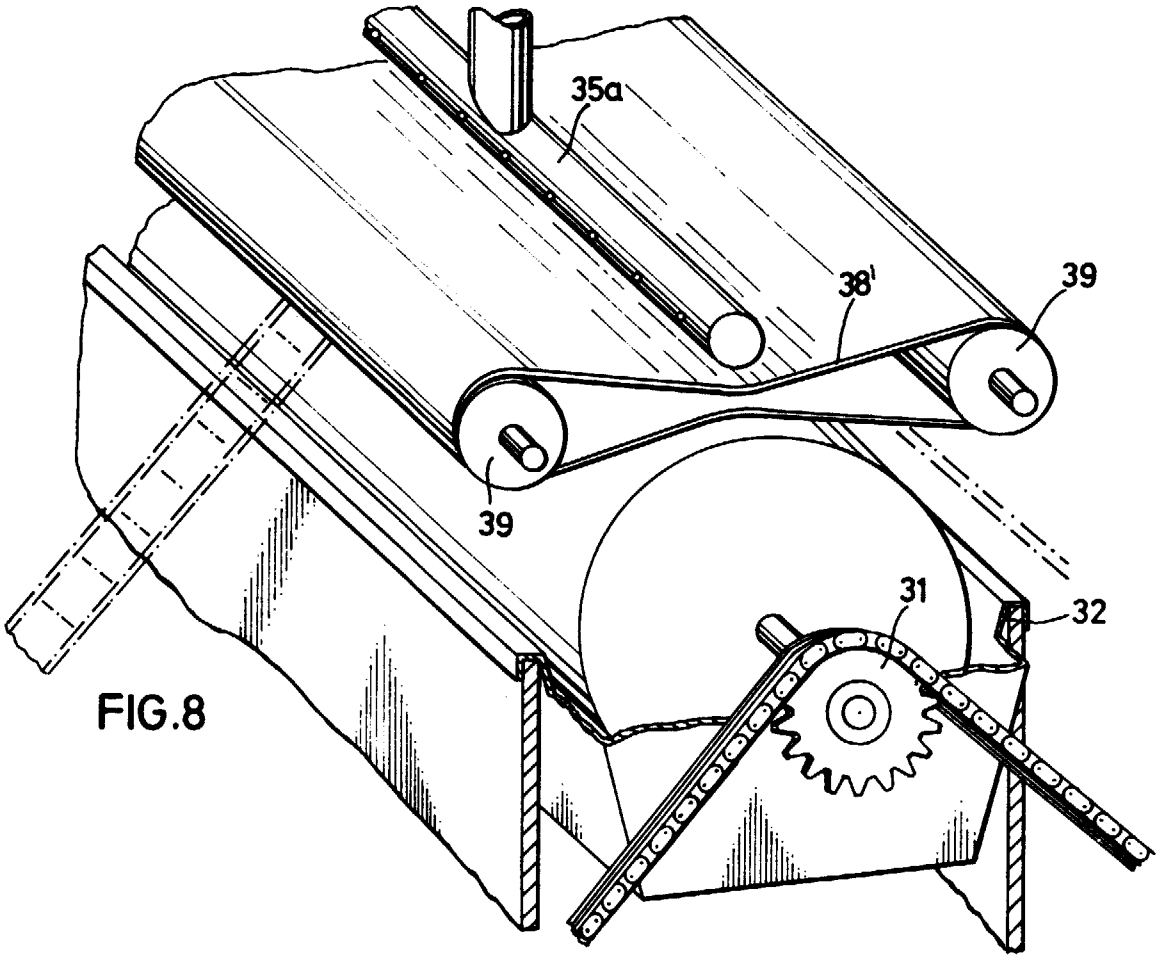

A somewhat modified version of the embodiment [in] *of* FIG. 6 is shown in FIGS. 7 and 8. The embodiment in FIGS. 7 and 8 is largely the same as in FIG. 6[,] except that a water supply tube 35a is located above the upper run of the endless band [which is here identified with reference numeral 38'] *identified as 38'* and deflects it downwardly so as to form a shallow trough 38a. Water is supplied to the tube 35a, which latter is perforated (see FIG. 8) by a supply conduit which is shown in FIG. 8 and communicates with a not-illustrated source of rinsing water. The water issuing from the perforations of the tube 35a enters the trough 38a and runs out of the opposite open ends of this trough and over the end faces of the roller 31 into the receptacle 32 as described previously. The water level is maintained constant in the receptacle 32 in the manner described earlier.

The tube 35a could also be constructed as a hollow roller provided with perforations from which the water can issue, but in that case the supply of water to it would evidently have to be axially of the tube 35a, rather than normal to the axis as shown in FIG. 8. The purpose of having the tube 35a constructed as a roller which would be driven in rotation by engagement with the upper run of the endless band 38'[,] would be to reduce friction between the band 38' and the emulsion carrier 5 as much as possible.

The fact that the diameter of the roller 41 (see FIG. 1) is between 1 and 2% smaller than that of the other rollers was mentioned earlier. The purpose of this is to assure that the remaining rollers, i.e. 21, 22, 31, exert constantly a small tension upon the incoming emulsion carrier 5, thus compensating for the tendency of the emulsion carrier 5 to [elongated] *elongate* as it travels through the respective bath.

By having the successive containers 2 spaced apart and the devices 3 located between them, the radius of curvature of the emulsion carrier 5 as the same travels from a preceding container 2 into a succeeding container 2 [via] *by* the device 3, can be rather large and less pressure needs to be exerted upon the carrier 5.

It will be understood that each of the elements described above, or two or more together, may also find a useful application in other types of constructions differing from the types described above.

While the invention has been illustrated and described as embodied in an apparatus for developing a travelling photographic emulsion carrier, it is not intended to be limited to the details shown[,] since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An apparatus for developing a travelling photographic emulsion carrier, comprising at least two laterally spaced apart containers having upper edges and being adapted to accommodate baths of treating liquid, emulsion carrier guide means in the respective containers and each comprising a plurality of guide rollers for guiding the carrier in a loop-shaped path having a bight, and a deflecting roller for deflecting the carrier in said bight *in the the lower portion of said container*, all of said rollers being located downwardly of the respective upper edges *of said containers* so as to be at least partially immersed in the respective bath, said guide rollers and deflecting roller in each of said containers [being of identical diameters and] being arranged in three rows in the respective container; [a receptacle located intermediate said containers for accommodating a body of fresh water; and carrier transfer roller means at least partly immersed in the body of water and operative for engaging and transferring the carrier from one to the other of said containers] *a rinsing trough located intermediate laterally arrayed, in-line film treating containers and providing a transfer means for the emulsion carrier between film treating containers, this transfer means including a transfer roller in said trough and adapted to carry said emulsion carrier over the upper edges of the spaced apart containers and on top of this roller; a rinsing bath of fresh water carried in this trough and with the lower periphery of said transfer roller constantly dipped into and emerging from the water in the rinsing trough, and rotatable means carried above the transfer roller and providing means for engaging the travelling photographic emulsion carrier as it is transported on the upper surface of said transfer roller so that as the transfer roller is rotated any residual quantity of bath treating liquid from a preceding container remaining on the travelling emulsion carrier is removed by squeezing by the transfer roller and the rotatable means as this emulsion carrier is brought between the transfer roller and the rotatable means, the travelling emulsion carrier is constantly cleaned by the application of fresh water to the periphery of the transfer roller as said roller is rotated into the rinsing bath of fresh water.*

[2. An apparatus as defined in claim 1, wherein said receptacle is suspended intermediate said containers.]

3. An apparatus as defined in claim 1, wherein said guide rollers and deflecting rollers in each container are arranged in form of a center upright row, a first outer upright row for guiding the carrier in the descending portion of said path, and a second outer upright row for guiding the carrier in the ascending portion of said path, said center row and said second outer row each having an uppermost guide roller, the guide rollers of said second outer row except for the uppermost one thereof being mounted for synchronous rotation, and the uppermost guide roller of said second outer row being located slightly lower than the uppermost guide roller of said center row and having slight freedom of upward floating to abut said uppermost guide roller of said center row.

[4. An apparatus as defined in claim 1; further comprising a feeding roller for feeding said carrier to said guide roller means and having a diameter which is about 1–2% smaller than the diameter of said rollers of said guide roller means.]

5. An apparatus as defined in claim 1; [further comprising] *in which the rotatable means carried above the transfer roller is an* endless resiliently deformable counter-roller [means] above said transfer roller [means] in loose engagement therewith.

6. An apparatus as defined in claim 1, [said] *in which the* transfer [roller] means [comprising] *including* a transfer roller having an axis of rotation[;] and [further comprising] *the rotatable means includes* two counter rollers loosely engaging said transfer roller at opposite sides of and symmetrically with reference to[,] said axis of rotation *of the transfer roller.*

7. An apparatus as defined in claim 1, said transfer [roller] means [comprising] *includes* a transfer roller having an axis of rotation; [further comprising] *the rotatable means includes* two counter rollers loosely engaging said transfer roller at opposite sides of and symmetrically with reference to, said axis of rotation *of the transfer roller*; and means for directing rinsing water towards said transfer roller intermediate said counter rollers.

*8. An apparatus for developing a travelling photographic emulsion carrier comprising of at least two laterally spaced apart film treating containers having upper edges and being adapted to accommodate baths of treating liquid and including emulsion carrier guide means in the respective containers and each carrier guide means having a plurality of guide rollers for guiding the photographic emulsion carrier in a U-shaped path, this apparatus having a rinsing apparatus including: (a) a rinsing trough located intermediate laterally arrayed in-line film treating containers, this rinsing trough providing for a transfer means between the film treating containers, this transfer means including a transfer roller driven at the speed of the emulsion carrier and positioned in said trough so that the upper portion of said transfer roller is adapted to carry from and to adjacent film treating containers, said emulsion carrier over and on top of this transfer roller; (b) a rinsing bath of fresh water carried in the trough; (c) a shaft and bearings adapted to rotatably carry the transfer roller in the trough and with this transfer roller so positioned that the lower peripheral portion of said roller is constantly within the bath of fresh water and during rotation of this roller the peripheral surface is constantly dipped into and emerges from the rinsing water in the trough and, (d) a rotatable means disposed above the transfer roller and adapted to engage the travelling photographic emulsion carrier so as said emulsion carrier is fed between the rotatable means and the upper surface of the transfer roller and as this transfer roller dips into the fresh water the peripheral portion of said roller carries this water so that the rotatable means and the transfer roller engage the travelling photographic emulsion carrier carried therebetween so that any residual quantity of bath liquid from a film treating preceding container is squeezed from the travelling photographic emulsion carrier and with the transfer roller and the emulsion carrier being constantly cleaned by the application of fresh water from the transfer roller as said roller is rotated into the rinsing bath of fresh water.*

*9. Apparatus as defined in claim 8 in which the rotatable means which engages the travelling emulsion carrier and brings said carrier in way of the transfer roller is a squeeze roller having an axis parallel to the axis of the transfer roller and with this squeeze roller having a resilient outer surface.*

*10. Apparatus as defined in claim 9 in which the resilient outer roller surface of said squeeze roller is rubber-like plastic foam material.*

*11. Apparatus as defined in claim 8 in which the rotatable means which engages the travelling emulsion carrier includes two counter rollers above the transfer roller and with the counter rollers each having parallel axis of rotation with these axis being on opposite sides of a vertically arranged plane passing through the axis of rotation of the transfer roller.*

*12. Apparatus as defined in claim 10 in which an outlet nozzle is supplied and adapted to direct a flow of fresh water to the top of the emulsion carrier and between the above two counter rollers.*

*13. Apparatus as defined in claim 8 in which the rotatable means for which engages the travelling emulsion carrier and brings said carrier in way of the transfer roller is an endless band trained around two rollers each having an axis parallel to the axis of rotation of the transfer roller, the lower run of this endless band engaging the top periphery of the transfer roller.*

*14. Apparatus as defined in claim 13 in which there is provided means for tightening the endless band so as to cause the lower run of the endless band to engage the transfer roller with a slight pressure so that liquid from the preceding bath of a film treating container is squeezed from the travelling emulsion carrier.*

*15. Apparatus as defined in claim 14 in which an additional washing of the endless band is provided by a water supply tube disposed above the endless band.*

*16. Apparatus as defined in claim 15 in which the water supply tube is adapted to engage the top surface of the endless band to deflect it sufficiently to form a shallow trough into which the water supply flows from the tube.*

* * * * *